US012589738B2

(12) United States Patent
Nishiwaki

(10) Patent No.: US 12,589,738 B2
(45) Date of Patent: Mar. 31, 2026

(54) VEHICLE-TRAVELING CONTROL SYSTEM AND VEHICLE-TRAVELING CONTROL METHOD

(71) Applicant: Mitsubishi Electric Corporation, Tokyo (JP)

(72) Inventor: Kazuhiro Nishiwaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 134 days.

(21) Appl. No.: 18/456,788

(22) Filed: Aug. 28, 2023

(65) Prior Publication Data

US 2024/0391454 A1 Nov. 28, 2024

(30) Foreign Application Priority Data

May 24, 2023 (JP) ................................. 2023-085085

(51) Int. Cl.
| | |
|---|---|
| *G08G 1/16* | (2006.01) |
| *B60W 30/09* | (2012.01) |
| *B60W 30/095* | (2012.01) |
| *B60W 30/18* | (2012.01) |

(52) U.S. Cl.
CPC ........ *B60W 30/09* (2013.01); *B60W 30/0956* (2013.01); *B60W 30/18163* (2013.01); *B60W 2554/80* (2020.02); *G08G 1/166* (2013.01)

(58) Field of Classification Search
CPC ............. B60W 30/0956; B60W 30/09; B60W 30/095; B60W 30/18163; B60W 2554/4045; B60W 2554/80; B60W 50/0097; G08G 1/166
See application file for complete search history.

(56) References Cited

U.S. PATENT DOCUMENTS

| | | | | |
|---|---|---|---|---|
| 10,741,079 | B2 * | 8/2020 | Takabayashi ....... | B60W 30/095 |
| 11,001,256 | B2 * | 5/2021 | Packer .............. | B60W 30/0956 |
| 11,227,499 | B2 * | 1/2022 | Wakayanagi .......... | G08G 1/166 |
| 12,187,269 | B2 * | 1/2025 | Dede ................. | G01C 21/3602 |
| 2024/0262366 | A1 * | 8/2024 | Takashima ........ | B60W 30/0956 |
| 2024/0308507 | A1 * | 9/2024 | Kueperkoch ..... | B60W 30/0956 |

FOREIGN PATENT DOCUMENTS

JP 2017-165197 A 9/2017

* cited by examiner

*Primary Examiner* — Gonzalo Laguarda
(74) *Attorney, Agent, or Firm* — Sughrue Mion, PLLC

(57) ABSTRACT

There is provided a vehicle-traveling control system that can appropriately avoid a collision. A vehicle-traveling control system acquires positional and speed information on an own vehicle, positional and speed information on neighboring vehicles, determines a subject vehicle that travels toward the own vehicle and may collide with the own vehicle, sets a collision assumption position where the own vehicle may collide with the subject vehicle, and continuously generates an imaginary vehicle that reaches the collision assumption position when the subject vehicle reaches there, and issues a command for controlling a distance between the own vehicle and the imaginary vehicle.

9 Claims, 11 Drawing Sheets

WHEN JOINING CONTROL IS STARTED

WHEN JOINING CONTROL IS PERFORMED

FIG. 1

WHEN JOINING CONTROL IS STARTED

WHEN JOINING CONTROL IS PERFORMED

WHEN JOINING CONTROL IS STARTED

WHEN JOINING CONTROL IS PERFORMED

WHEN JOINING CONTROL IS STARTED

WHEN JOINING CONTROL IS PERFORMED

WHEN LANE-CHANGING CONTROL IS STARTED

WHEN LANE-CHANGING CONTROL IS PERFORMED

WHEN CONTROL IS STARTED

WHEN CONTROL IS PERFORMED

VEHICLE-TRAVELING CONTROL SYSTEM AND VEHICLE-TRAVELING CONTROL METHOD

INCORPORATION BY REFERENCE

The disclosure of Japanese Patent Application No. 2023-085085 filed on May 24, 2023 including its specification, claims and drawings, is incorporated herein by reference in its entirety.

BACKGROUND

The present disclosure relates to a vehicle-traveling control system and a vehicle-traveling control method.

In recent years, there has been studied an automatic driving technology for automatically controlling a traveling position, a speed, and the like. In addition, there has been also studied a control technology for traveling while avoiding a collision with another vehicle, when a lane in the traveling route of a vehicle is changed or the vehicle joins the main lane from a branch lane. For example, Patent Document 1 discloses a vehicle control system in which in the case where an own vehicle joins the main lane from a branch lane, the acceleration/deceleration of the own vehicle is controlled toward a joining target position decided in consideration of the position and the speed of another vehicle traveling on the main lane so that the own vehicle is made to smoothly join the main lane.

Patent Document 1: JP 2017-165197 A

SUMMARY

However, in a conventional vehicle control system, the acceleration/deceleration of an own vehicle is controlled toward a decided joining target position; therefore, in some cases, it is difficult to control the acceleration/deceleration, depending on a traveling state of another vehicle, for example, when the speed of said another vehicle has exceeded the speed limit.

The present disclosure has been implemented in order to solve the foregoing problem; the objective thereof is to provide a vehicle-traveling control system that can appropriately avoid a collision in consideration of a traveling state of another vehicle.

A vehicle-traveling control system according to the present disclosure including:

an acquisition unit that acquires positional information and speed information on an own vehicle and that acquires positional information pieces and speed information pieces on neighboring vehicles existing in a periphery of the own vehicle;

a subject vehicle determination unit that determines a subject vehicle that travels toward a travel destination of the own vehicle and may collide with the own vehicle, based on positional information and speed information on the own vehicle and positional information pieces and speed information pieces on the neighboring vehicles;

an imaginary-vehicle generation unit that sets a collision assumption position at which the own vehicle may collide with the subject vehicle, and continuously generates an imaginary vehicle that travels at an imaginary speed and reaches the collision assumption position when the subject vehicle reaches the collision assumption position, from a time point before the own vehicle reaches the collision assumption position; and a vehicle control unit that issues a command for controlling a distance between the own vehicle and the imaginary vehicle.

A vehicle-traveling control method according to the present disclosure including:

a step of acquiring positional information and speed information on an own vehicle and positional information pieces and speed information pieces on neighboring vehicles existing in a periphery of the own vehicle;

a step of determining a subject vehicle that travels toward a travel destination of the own vehicle and may collide with the own vehicle, based on positional information and speed information on the own vehicle and positional information pieces and speed information pieces on the neighboring vehicles;

a step of setting a collision assumption position at which the own vehicle may collide with the subject vehicle and continuously generating an imaginary vehicle that travels at an imaginary speed and reaches the collision assumption position when the subject vehicle reaches the collision assumption position, from a time point before the own vehicle reaches the collision assumption position; and a step of issuing a command for controlling a distance between the own vehicle and the imaginary vehicle.

According to the present disclosure, there is continuously generated an imaginary vehicle that travels at an imaginary speed and reaches a collision assumption position when a subject vehicle having a possibility of collision reaches the collision assumption position, from a time point before the subject vehicle reaches the collision assumption position, and the distance between an own vehicle and the imaginary vehicle is controlled; as a result, appropriate collision-prevention control with consideration of the traveling state of the subject vehicle can be performed.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 1 is a schematic block diagram representing a vehicle-traveling control system and peripheral devices, to be mounted in an own vehicle, according to Embodiment 1;

DETAILED DESCRIPTION OF THE EMBODIMENTS

Embodiment 1

Figure 2:
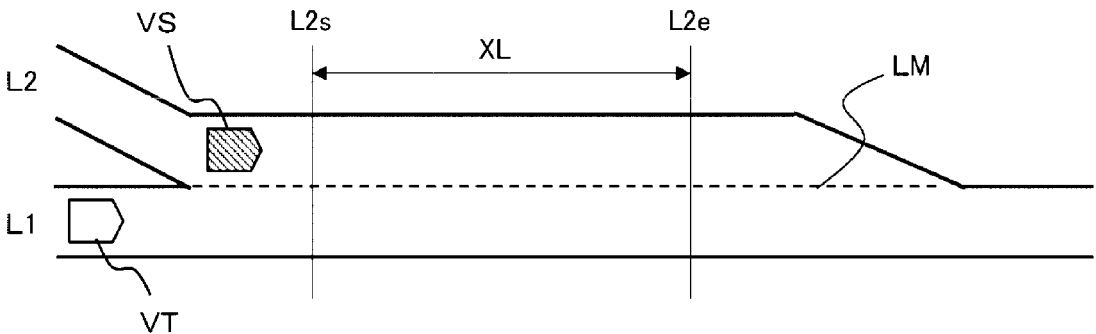
FIG. 2 is a schematic drawing representing a joining portion of a road where a vehicle-traveling control system according to Embodiment 1 is utilized.

A vehicle-traveling control system 100 according to Embodiment 1 will be explained by use of the drawings.

Figure 1:
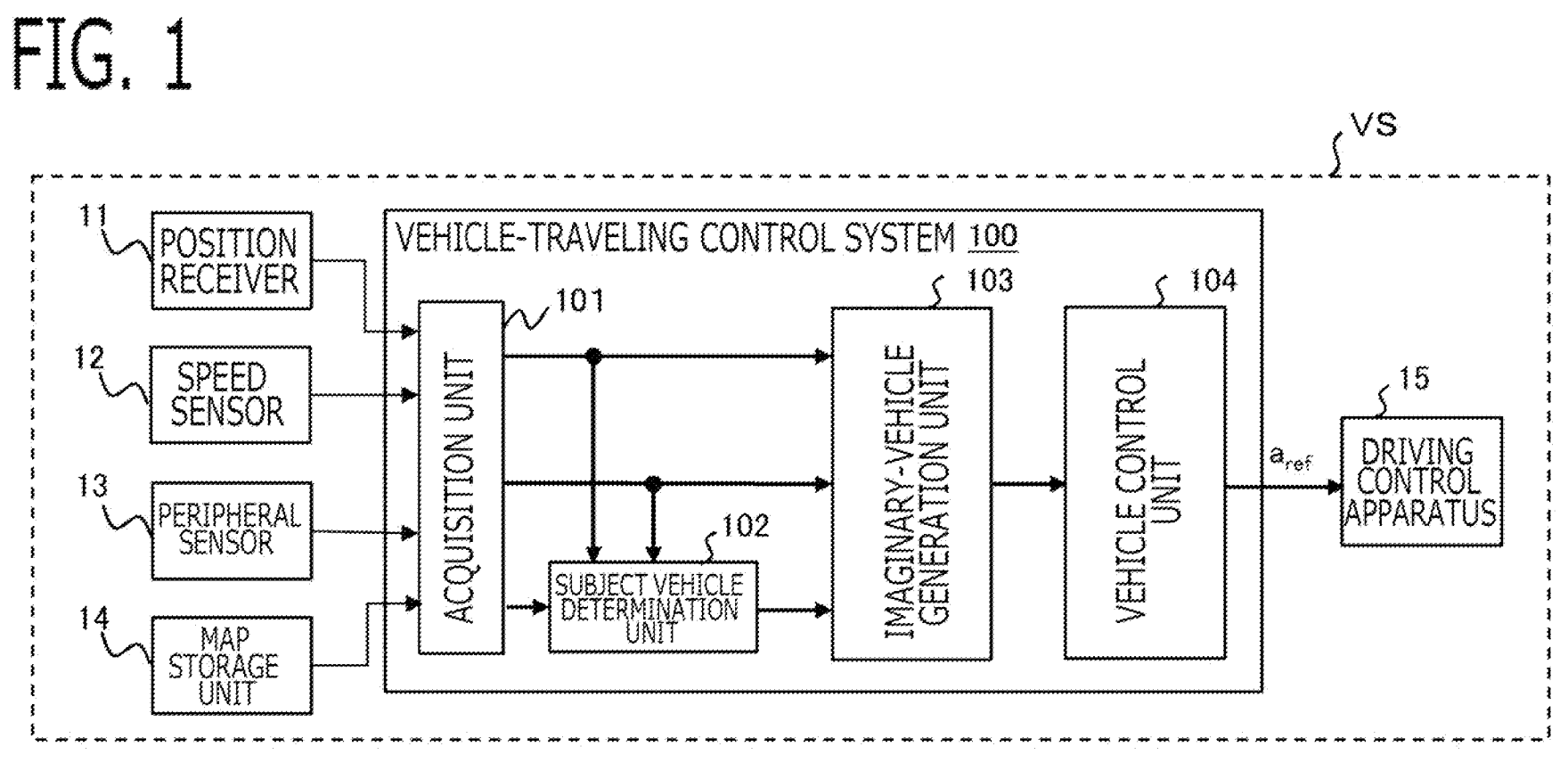

FIG. 1 is a schematic block diagram representing the vehicle-traveling control system 100 and peripheral devices to be mounted in an own vehicle VS. A position receiver 11, a speed sensor 12, a peripheral sensor 13, a map storage unit 14, and a driving control apparatus 15, as the peripheral devices, and the vehicle-traveling control system 100 for processing these information pieces are mounted in the own vehicle VS.

The position receiver 11 receives positional information on the own vehicle VS by means of, for example, a GPS (Global Positioning System) signal from a satellite. The speed sensor 12 detects speed information on the own vehicle VS. The peripheral sensor 13 detects a neighboring vehicle existing in the periphery of the own vehicle VS and detects positional information and speed information on the neighboring vehicle. The map storage unit 14 stores road information, for example, road information pieces on a main lane L1 and a branch lane L2 of an after-mentioned road.

The vehicle-traveling control system 100 includes an acquisition unit 101, a subject vehicle determination unit 102, an imaginary-vehicle generation unit 103, and a vehicle control unit 104.

The acquisition unit 101 acquires positional information and speed information on the own vehicle VS and acquires positional information and speed information on a neighboring vehicle existing in the periphery of the own vehicle VS. Based on the acquired positional information and speed information on the own vehicle VS and the positional information and speed information on a neighboring vehicle, which have been acquired by the acquisition unit 101, the subject vehicle determination unit 102 determines a subject vehicle VT that is traveling toward the travel destination of the own vehicle VS and may collide with the own vehicle VS. Then, the subject vehicle determination unit 102 acquires the positional information and the speed information on the determined subject vehicle VT. The imaginary-vehicle generation unit 103 sets a collision assumption position Ps at which the subject vehicle VT may collide with the own vehicle VS, and generates an imaginary vehicle VI that travels at an imaginary speed $V_I$ and reaches the collision assumption position Ps when the subject vehicle VT reaches the collision assumption position Ps. The imaginary vehicle VI is generated on the main lane L1 where the subject vehicle VT travels continuously from a time point before the own vehicle VS reaches the collision assumption position Ps.

The vehicle control unit 104 issues a command for controlling the distance between the own vehicle VS and the imaginary vehicle VI. Then, the vehicle control unit 104 outputs, to the driving control apparatus 15, a command for the own vehicle VS to join the main lane at an appropriate speed with which the own vehicle VS can avoid the subject vehicle VT, by securing the distance between the own vehicle VS and the generated imaginary vehicle VI. Based on the command from the vehicle control unit 104 of the vehicle-traveling control system 100, the driving control apparatus 15 controls un unillustrated driving apparatus and braking apparatus so as to control acceleration/deceleration of the own vehicle VS.

The functions of the vehicle-traveling control system 100 will be explained in detail, by use of FIGS. 1 through 8.

FIG. 2 is a schematic drawing representing a joining portion of a road where the vehicle-traveling control system 100 is utilized, when viewed from the top surface thereof. At the joining portion of the road, the main lane L1 and the branch lane L2 are connected with each other; the own vehicle VS is trying to move to the main lane L1 from the branch lane L2 on which the own vehicle VS is travelling and that joins the main lane L1. The subject vehicle VT is a vehicle that travels on the main lane L1. After entering the joining portion, the own vehicle VS moves while accelerating or decelerating so as to avoid the subject vehicle VT, and then joins the main lane L1. FIG. 2 represents an example in which the main lane L1 and the branch lane L2 are provided in parallel with each other; however, it is not necessarily required that they are in parallel with each other.

The starting point at which joining control is started on the branch lane L2, based on the position of the own vehicle VS and road information on the joining portion, will be referred to as L2s; the target ending point at which the joining control is completed will be referred to as L2e; the section from the starting point L2s to the target ending point L2e will be referred to as a joining control section. The length of the joining control section to be set in the joining portion is XL connecting the starting point L2s with the target ending point L2e. The starting point L2s and the target ending point L2e are provided within a joining lane LM of the joining portion. In the case where the own vehicle VS accelerates and joins the branch lane L2 at a place before the subject vehicle VT, the target ending point L2e is set before the terminal portion of the joining lane LM.

The acquisition unit 101 acquires the road information from the map storage unit 14 and the positional information on the own vehicle VS from the position receiver 11. In addition, the acquisition unit 101 acquires the speed information on the own vehicle VS from the speed sensor 12 and positional information pieces and speed information pieces on neighboring vehicles including the subject vehicle VT from the peripheral sensor 13. The subject vehicle determination unit 102 determines the subject vehicle VT to be avoided, based on the information transmitted from the acquisition unit 101, and acquires the positional information and the speed information on the determined subject vehicle VT from the acquisition unit 101.

Describing more specifically, the subject vehicle determination unit 102 acquires the positional information pieces on the neighboring vehicles and then determines the subject vehicle VT, among the acquired neighboring vehicles, that exists on the main lane L1, which is the travel destination of the own vehicle VS, and may collide with the own vehicle VS. For example, in the example in FIG. 2, among the vehicles existing on the main lane L1, the subject vehicle VT is determined. No other vehicles traveling on the main lane L1 are represented; however, in the case where two or more vehicles are traveling on the main lane L1, the subject vehicle VT among the two or more vehicles is the vehicle to be determined as the subject. Then, the subject vehicle determination unit 102 outputs the positional information and the speed information on the subject vehicle VT, acquired from the acquisition unit 101, to the imaginary-vehicle generation unit 103. In the case where no vehicle that may collide with the own vehicle VS exists in the joining portion of the main lane L1, the subject vehicle VT is not determined.

Based on the positional information and the speed information on the subject vehicle VT, the positional information on the own vehicle VS, and the speed information on the own vehicle VS acquired from the speed sensor 12, the imaginary-vehicle generation unit 103 generates the imaginary vehicle VI that travels on the main lane L1. Then, the imaginary-vehicle generation unit 103 outputs the positional information and the speed information on the imaginary vehicle VI to the vehicle control unit 104.

Figure 3A:
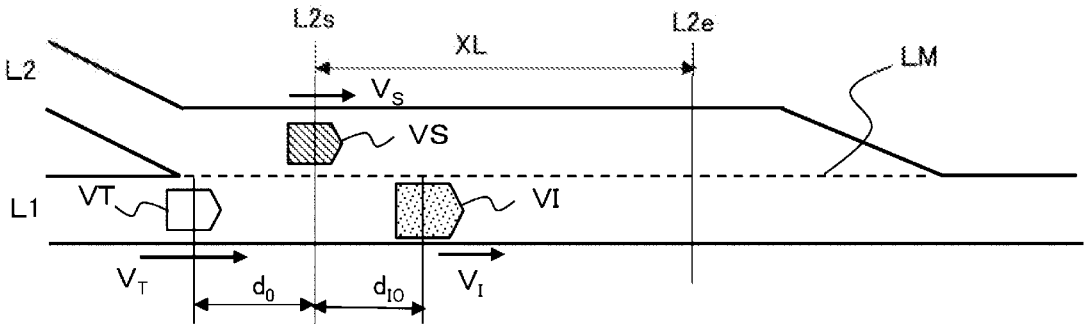
FIG. 3A is a schematic drawing for explaining processing by an imaginary-vehicle generation unit according to Embodiment 1, at a time when joining control is started.
Figure 3B:
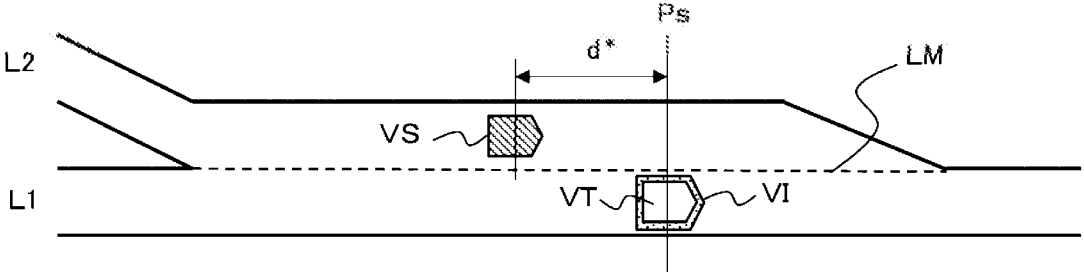
FIG. 3B is a schematic drawing for explaining processing by an imaginary-vehicle generation unit according to Embodiment 1, at a time when the joining control is performed.

An example in which the imaginary vehicle VI is generated will be explained. FIG. 3A,3B are schematic drawings for explaining processing by the imaginary-vehicle generation unit 103, at a time when the joining control is started and a time when the joining control is performed. There are exemplarily represented a state where the joining control is started at a time when the own vehicle VS passes through the starting point L2s of the joining control section (FIG. 3A) and a state where the collision assumption position Ps is set to the target ending point L2e of the joining control section and then the joining control for securing a target distance d* is performed (FIG. 3B). In FIG. 3A,3B, the subject vehicle VT is the vehicle that is traveling on the main lane L1 and that has been determined by the subject vehicle determination unit 102 to have a possibility of colliding with the own vehicle VS. In this situation, the relative distance between the subject vehicle VT and the own vehicle VS is designated by "d"; the initial value thereof at a time when the joining control is started is designated by "$d_0$". The relative distance d in the forward direction of the own vehicle VS is positive; in the case where as represented in FIG. 3A, the subject vehicle VT travels backward, d<0. The speed of the own vehicle VS is designated by $V_s$, and the speed of the subject vehicle VT is designated by $V_T$.

The subject vehicle VT travels the distance ($XL-d_0$) at the speed $V_T$. Thus, the time T in which the subject vehicle VT travels to the target ending point L2e of the joining control section is expressed by the equation (1).

$$T = \frac{XL - d_0}{V_T} \tag{1}$$

The imaginary-vehicle generation unit 103 generates the imaginary vehicle VI (the relative distance between the own vehicle VS and the imaginary vehicle VI is $d_{I0}$ at a time when the joining control is started). The time T in which the imaginary vehicle VI travels the distance ($XL-d_{I0}$) at the imaginary speed $V_I$ to the target ending point L2e of the joining control section is expressed by the equation (2).

$$T = \frac{XL - d_{I0}}{V_I} \tag{2}$$

When it is assumed that the subject vehicle VT and the imaginary vehicle VI reach the target ending point L2e at one of the same time $T_s$, the initial value $d_{I0}$ of the relative distance $d_I$ of the imaginary vehicle VI is expressed by the equation (3).

$$d_{I0} = XL - (XL - d_0)\frac{V_I}{V_T} = XL\frac{V_T - V_I}{V_T} + d_0\frac{V_I}{V_T} \tag{3}$$

That is to say, the target ending point L2e of the joining control section, represented in FIG. 3B, is the collision assumption position Ps at which the respective positions of the subject vehicle VT and the imaginary vehicle VI coincide with each other. As described above, the collision assumption position Ps at which the subject vehicle VT may collide with the own vehicle VS can be set based on the positional information on the own vehicle VS and the positional information and the speed information on the subject vehicle VT.

The imaginary speed $V_I$ of the imaginary vehicle VI is set, for example, to the speed $V_s$ of the own vehicle VS. It may be allowed that the imaginary speed $V_I$ is a speed preliminarily set based on a speed limit $V_{LIM}$ of the main lane L1, acquired from the road information in the map storage unit 14, a target speed obtained with reference to the speed limit $V_{LIM}$, the driver, vehicle apparatuses, and the like.
(Case 1)

In this situation, in the case where when the speed $V_T$ of the subject vehicle VT exceeds the speed $V_I$ of the imaginary vehicle VI ($V_T > V_I$), the imaginary vehicle VI that travels in front of the subject vehicle VT is generated (in FIG. 3A, $d_{I0} > d_0$), after traveling in front of the subject vehicle VT, the imaginary vehicle VI is caught up with by the subject vehicle VT at the target ending point L2e of the joining control section represented in FIG. 3B at a predetermined time point $T_s$, and hence the respective positions of the imaginary vehicle VI and the subject vehicle VT coincide with each other. Accordingly, the target ending point L2e of the joining control section is the collision assumption position Ps.

In this case, as represented in FIG. 3B, the own vehicle VS decelerates so as to move to a position behind the imaginary vehicle VI on the branch lane L2 so that the target distance d* between the own vehicle VS on the branch lane L2 and the imaginary vehicle VI on the main lane L1 can be secured, before the time point $T_s$ at which the subject vehicle VT passes through the target ending point L2e of the joining control section. Then, the own vehicle VS moves to and joins the main lane L1 at a time point at which the target distance d* is secured.

(Case 2)

In contrast, in the case where when the speed VT of the subject vehicle VT does not exceed the speed $V_I$ of the imaginary vehicle VI ($V_T$<$V_I$), the imaginary vehicle VI that travels behind the subject vehicle VT is generated (in FIG. 4A, $d_{I0}$<$d_0$), after traveling behind the subject vehicle VT, the imaginary vehicle VI catches up with the subject vehicle VT at the target ending point L2e of the joining control section at the predetermined time point $T_s$, and hence the respective positions of the imaginary vehicle VI and the subject vehicle VT coincide with each other. Accordingly, the target ending point L2e of the joining control section is the collision assumption position Ps.

Figure 4A:
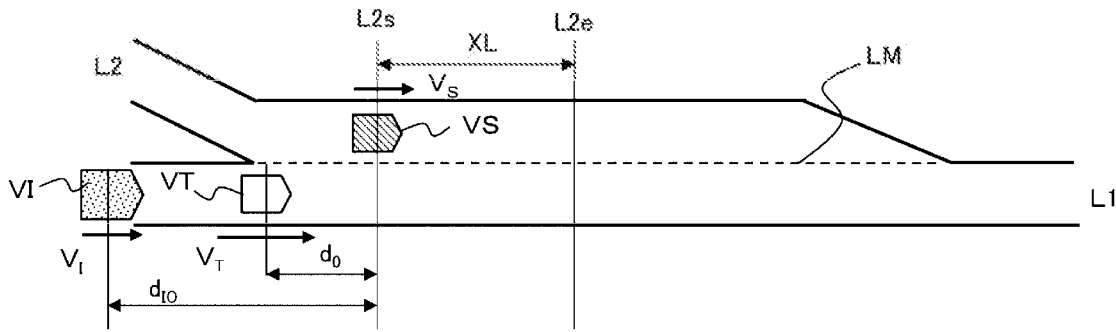
FIG. 4A is a schematic drawing for explaining processing by the imaginary-vehicle generation unit according to Embodiment 1, at a time when joining control is started.
Figure 4B:
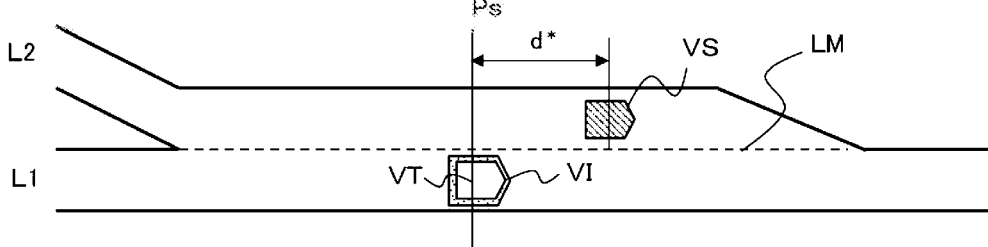
FIG. 4B is a schematic drawing for explaining processing by the imaginary-vehicle generation unit according to Embodiment 1, at a time when the joining control is performed.

In this case, the own vehicle VS accelerates so as to move to, for example, a position in front of the imaginary vehicle VI on the branch lane L2 so that the target distance d* between the own vehicle VS on the branch lane L2 and the imaginary vehicle VI on the main lane L1 can be secured before the time point $T_s$ at which the subject vehicle VT passes through the target ending point L2e of the joining control section. Then, the own vehicle VS moves to and joins the main lane L1 at a time point at which the target distance d* is secured (FIG. 4B). The joining control represented in FIG. 4B may be perform so that on the branch lane L2, the own vehicle VS moves to a position behind the imaginary vehicle VI.

(Case 3)

Figure 5A:
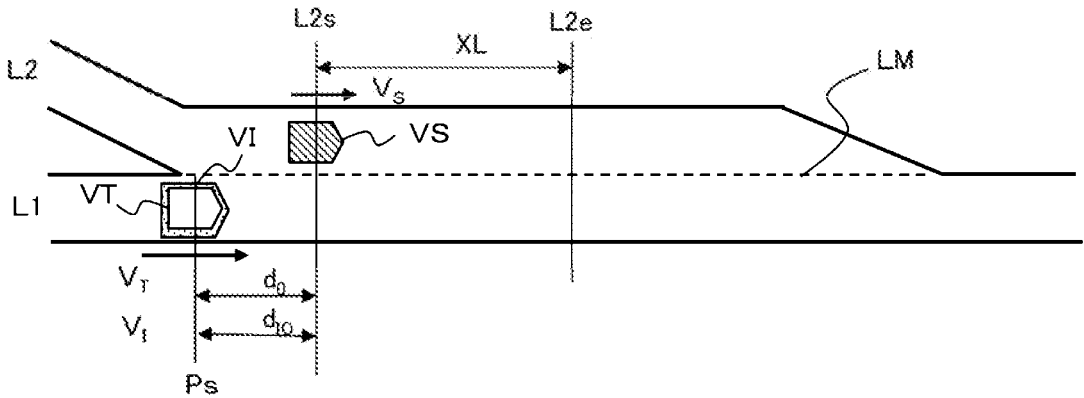
FIG. 5A is a schematic drawing for explaining processing by the imaginary-vehicle generation unit according to Embodiment 1, at a time when joining control is started.

In the case where the speed VT of the subject vehicle VT is equal to the speed $V_I$ of the imaginary vehicle VI ($V_T$=$V_I$), the imaginary vehicle VI is generated at the position of the subject vehicle VT (in FIG. 5A, $d_{I0}$=$d_0$). In this case, from a time point at which the joining control is started, the respective positions of the imaginary vehicle VI and the subject vehicle VT coincide with each other; the position of the coincidence is the collision assumption position Ps.

Figure 5B:
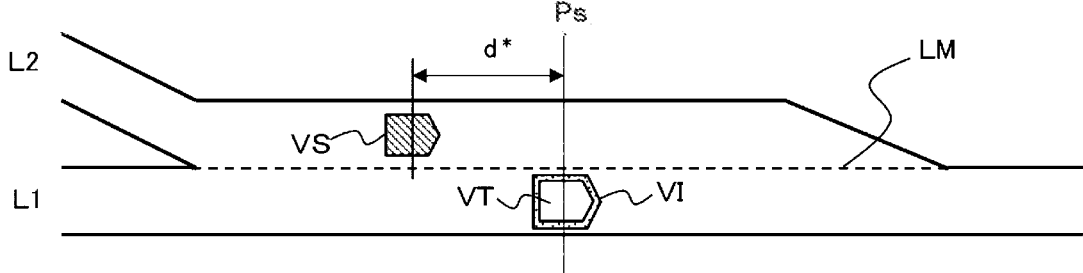
FIG. 5B is a schematic drawing for explaining processing by the imaginary-vehicle generation unit according to Embodiment 1, at a time when the joining control is performed.

In this case, from the time point at which the control is started, the own vehicle VS accelerates or decelerates so that the target distance d* between the own vehicle VS and the imaginary vehicle VI can be secured; then, at a time point at which the target distance d* has been secured, the own vehicle VS moves to and joins the main lane L1 (FIG. 5B).

An acceleration command $a_{ref}$ for securing the target distance d* is calculated by the equation (4) below. In this situation, d* is the target distance from the own vehicle VS to the imaginary vehicle VI; when d*>0, the own vehicle VS decelerates so as to move to a position behind the imaginary vehicle VI; when d*<0, the own vehicle VS accelerates so as to move to a position in front of the imaginary vehicle VI. In the equation (4), $K_{dp}$ and $K_{dd}$ denote a proportional gain and a differential gain, respectively, for controlling an inter-vehicle distance.

$$a_{ref} = K_{dp}(d_I - d^*) + K_{dd}(V_I - V_S) \tag{4}$$

The vehicle control unit 104 calculates the acceleration command $a_{ref}$, based on the speed information on the own vehicle VS and the positional information and the speed information on the imaginary vehicle VI. Then, the vehicle control unit 104 outputs the calculated acceleration command $a_{ref}$ to the driving control apparatus 15. The driving control apparatus 15 controls acceleration/deceleration of the own vehicle VS in accordance with the acceleration command $a_{ref}$.

As described above, in either the case where the speed of the subject vehicle VT is high (Case 1) or the case where the speed of the subject vehicle VT is low (Case 2), it is made possible to perform appropriate collision-prevention control in which the traveling state of the subject vehicle VT is considered. That is to say, letting $X_T$, $X_I$, $V_T$, and $V_I$ denote the distance between the subject vehicle VT and the collision assumption position Ps, the distance between the imaginary vehicle VI and the collision assumption position, the speed of the subject vehicle VT, and the imaginary speed, respectively, the imaginary vehicle VI is generated until the own vehicle VS reaches the collision assumption position Ps in such a way that the next equation (5) is satisfied, so that it is made possible to generate the imaginary vehicle VI while considering the traveling state of the subject vehicle VT, and hence appropriate collision-prevention control can be performed.

$$\frac{X_T}{V_T} = \frac{X_I}{V_I} \tag{5}$$

In either case, it goes without saying that the joining control section is set in such a way that the joining can be completed before the own vehicle VS reaches the terminal portion in the joining portion.

In addition, in the case where after avoiding the collision with the subject vehicle VT, the speed $V_S$ of the own vehicle VS is set to a setting speed $V_{set}$, and, for example, the $V_{set}$ is set to the speed limit $V_{LIM}$ of the main lane L1 to be acquired from the road information in the map storage unit 14, the speed limit of the main lane L1 can be observed. The setting speed $V_{set}$ may be either a target speed set with reference to the speed limit $V_{LIM}$ or a speed set by a driver.

Figure 6:
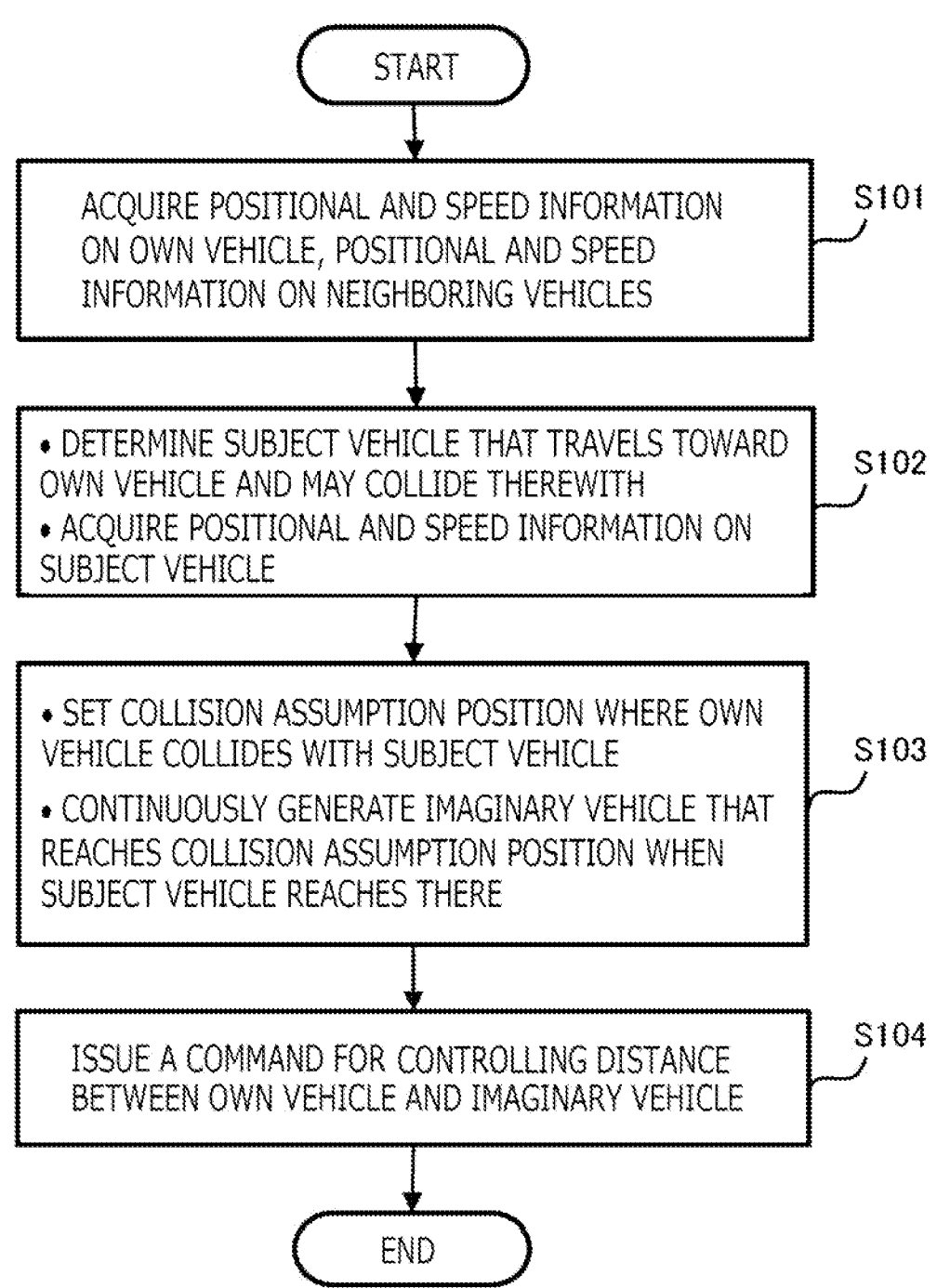
FIG. 6 is a flowchart representing the flow of processing performed by a vehicle-traveling control system according to Embodiment 1.

FIG. 6 is a flowchart representing the flow of processing performed by the vehicle-traveling control system 100. In the processing flow, when the control is started, the acquisition unit 101 acquires the positional information and the speed information on the own vehicle VS and the positional information pieces and the speed information pieces on the neighboring vehicles (the step S101).

After that, based on the information acquired by the acquisition unit 101, the subject vehicle determination unit 102 ascertains whether or not there exists a vehicle, among the neighboring vehicles traveling on the travel destination, that may collide with the own vehicle VS when, for example, the own vehicle VS joins the main lane L1 from the branch lane L2; in the case where there exists a vehicle that may collide with the own vehicle VS, the subject vehicle determination unit 102 determines the vehicle as the subject vehicle VT and then acquires the positional information and the speed information on the subject vehicle VT from the acquisition unit 101 (the step S102).

After that, the imaginary-vehicle generation unit 103 sets the collision assumption position Ps at which the subject vehicle VT may collide with the own vehicle VS, and continuously generates the imaginary vehicle VI that travels at the imaginary speed $V_I$ and reaches the collision assumption position Ps when the subject vehicle VT reaches the collision assumption position Ps, from a time point before the own vehicle VS reaches the collision assumption position Ps (the step S103).

Next, the vehicle control unit 104 issues a command for controlling the distance between the own vehicle VS and the imaginary vehicle VI (the step S104). Then, when the distance becomes the target distance d*, the vehicle control unit 104 notifies the driving control apparatus 15 that movement such as joining is feasible.

Figure 7:
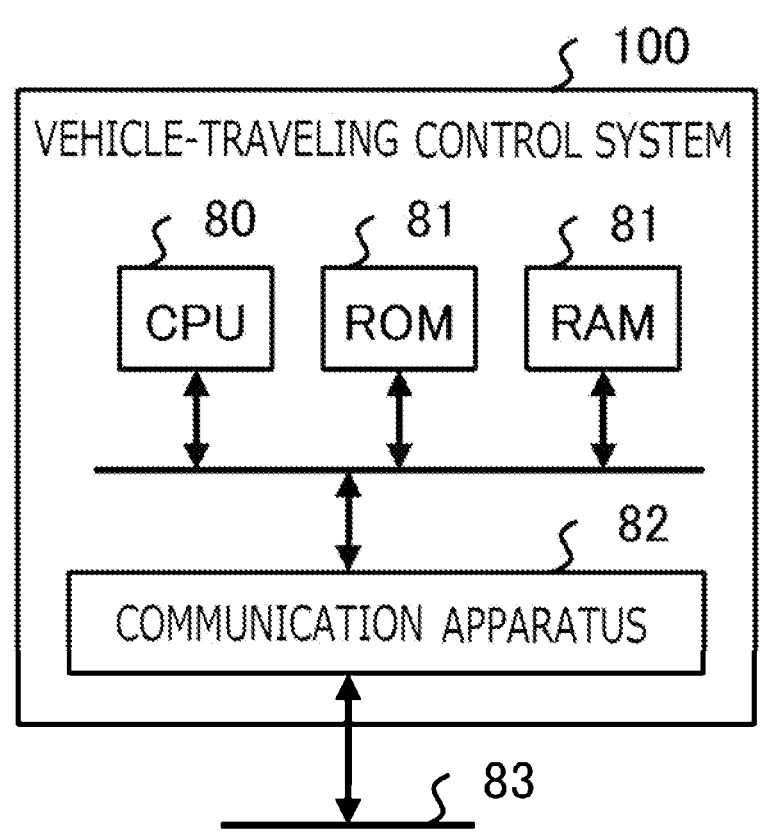
FIG. 7 is a schematic configuration diagram representing an example of a processing circuit that realizes respective functions of the vehicle-traveling control system according to Embodiment 1.

In this situation, the respective functions of the vehicle-traveling control system 100 are realized by a processing circuit. FIG. 7 is a configuration diagram representing an example of a processing circuit that realizes the respective functions of the vehicle-traveling control system 100. The vehicle-traveling control system 100 has a computing processing unit 80, two or more storage apparatuses 81, a communication apparatus 82, and a vehicle network 83.

As the computing processing unit 80, for example, a CPU (Central Processing Unit) is utilized. Each of the two or more storage apparatuses 81 performs transmission/reception of data with the computing processing unit 80 and stores the data. The communication apparatus 82 performs data communication with the vehicle network 83. The communication apparatus 82 performs communication with the map storage unit 14, the position receiver 11, and the peripheral sensor 13, as the external apparatuses, through the vehicle network 83.

As the computing processing unit 80 may be provided with, for example, a logic circuit utilizing an ASIC (Application Specific Integrated Circuit), an IC (Integrated Circuit), a DSP (Digital Signal Processor), an FPGA (Field Programmable Gate Array), or the like and with various kinds of signal processing circuits. In addition, it may be allowed that as the computing processing unit 80, two or more computing processing units of the same type or different types are provided and respective processing items are implemented by the two or more computing processing units in a sharing manner.

As the two or more storage apparatuses 81, for example, there are provided a RAM (Random Access Memory) that can read data from and write data in the computing processing unit 80 and a ROM (Read Only Memory) that can read data from the computing processing unit 80.

The computing processing unit 80 executes software items or programs stored in the two or more storage apparatuses 81 and collaborates with hardware devices, so that the respective functions of the vehicle-traveling control system 100 are realized. For example, in some cases, the computing processing unit 80 collaborates with other hardware devices such as the communication apparatus 82 and the like. The setting data pieces to be set in the vehicle-traveling control system 100 may be either stored, as part of software items or programs, in the two or more storage apparatuses 81 or inputted by a user.

As described above, when the own vehicle VS traveling on the branch lane L2 joins the main lane L1, l the vehicle-traveling control system 100 according to the present embodiment determines the subject vehicle VT traveling on the main lane L1, continuously generates the imaginary vehicle VI that travels at the imaginary speed $V_I$ and reaches the collision assumption position Ps when the subject vehicle VT that may collide with own vehicle VS reaches the collision assumption position Ps, from a time point before the subject vehicle VT reaches the collision assumption position Ps, and issues a command for controlling the distance between the own vehicle VS and the imaginary vehicle VI. As a result, traveling of the own vehicle VS can be controlled while the traveling state of the subject vehicle VT is considered so as to appropriately prevent the collision.

Moreover, even when the speed of the subject vehicle VT exceeds the speed limit or even when it is too slow, acceleration/deceleration of the own vehicle VS with respect to the imaginary vehicle VI is controlled, so that appropriate travel can be performed without generating acceleration/deceleration more than necessary.

Furthermore, after the target distance d* between the own vehicle VS and the imaginary vehicle VI has been secured and then movement such as joining has been performed, the acceleration command for the set speed is outputted, so that the travel can appropriately be continued at a desired speed. Even when the speed of the subject vehicle VT exceeds the speed limit $V_{LIM}$ of the road, the own vehicle VS can observe the $V_{LIM}$ and can travel at a desired speed when it desires to travel at the desired speed.

Figure 8A:
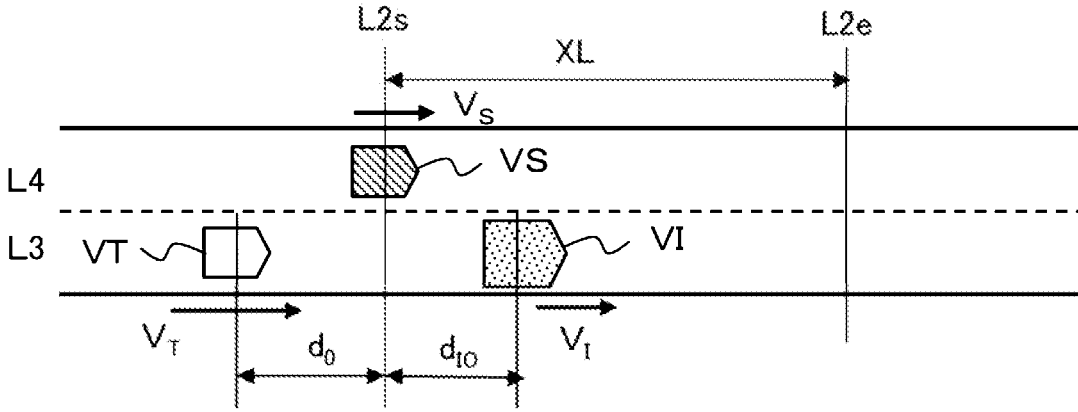
FIG. 8A is a schematic drawing for explaining processing by the imaginary-vehicle generation unit according to Embodiment 1, at a time when lane changing control is started.
Figure 8B:
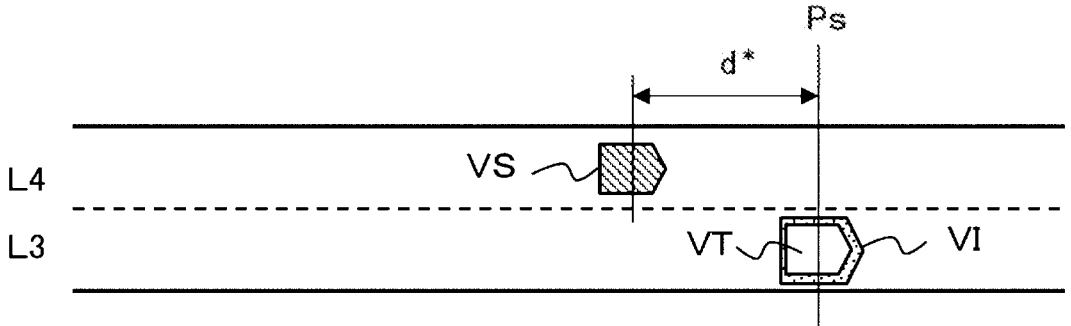
FIG. 8B is a schematic drawing for explaining processing by the imaginary-vehicle generation unit according to Embodiment 1, at a time when the lane changing control is performed.

In the present embodiment, there has been explained the case where the road information is acquired from the map storage unit 14; however, it may be allowed that, for example, the road information pieces on the joining portion and the like are comprehended by means of the peripheral sensor 13 and movement such as joining is performed without utilizing the map storage unit 14. In addition, there has been explained the case where the own vehicle VS joins the main lane L1 from the branch lane L2; however, the foregoing explanation may be applied to the case where, as represented in FIG. 8A,8B, the own vehicle VS moves to another lane on the road having two or more lanes. That is to say, when it is assumed that the branch lane L2 is a lane-changing original lane L4 and the main lane L1 is a lane-changing destination lane L3, the control can similarly be performed. In other words, in the case where the travel destination of the own vehicle VS is the lane-changing destination lane L3 on which the subject vehicle VT is traveling and the own vehicle VS changes lanes from the lane-changing original lane L4 to the lane-changing destination lane L3, the imaginary-vehicle generation unit 103 sets the collision assumption position Ps within a lane-changing assumption section in which the lanes are changed and then continuously generates the imaginary vehicle VI on the lane-changing destination lane L3 until the own vehicle VS reaches the collision assumption position Ps. In the case where the foregoing joining is performed, the lane-changing original lane L4 is a branch lane and the lane-changing destination lane L3 is the main lane; the own vehicle VS is a vehicle that joins the main lane from the branch lane and the subject vehicle VT is a vehicle that travels on the main lane. In this case, assuming that the joining control section where the own vehicle VS performs joining is the lane-changing assumption section, the collision assumption position Ps is set in the lane-changing assumption section, and the imaginary vehicle VI is continuously generated on the main lane until the own vehicle VS reaches the collision assumption position Ps. In addition, there has been explained the case where the acquisition unit 101 acquires the information pieces from the map storage unit 14, the position receiver 11, and the peripheral sensor 13, and the subject vehicle determination unit 102 determines the subject vehicle VT; however, it may be allowed that the subject vehicle determination unit 102 performs also the acquisition.

It may be allowed that the initial value of the speed $V_S$ of the own vehicle VS and a joining time $T_V$ are set and then length XL of the joining control section is determined from the product of them. The joining control section can be set without utilizing the road information. This method also makes it possible that an effect the same as the foregoing one is obtained.

Embodiment 2

A vehicle-traveling control system 200 according to Embodiment 2 will be explained by use of the drawings.

Figure 9:
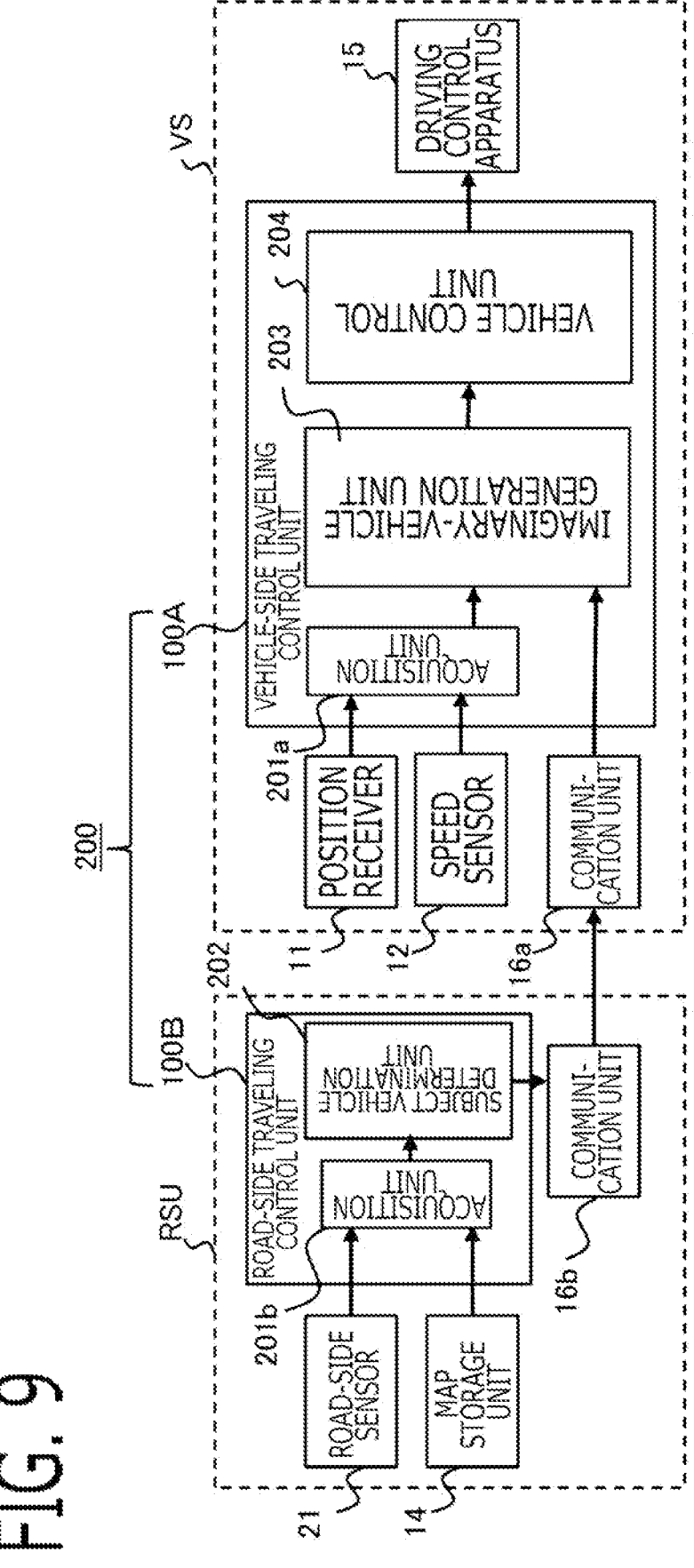
FIG. 9 is a schematic block diagram representing peripheral devices and a vehicle-traveling control system where acquisition units according to Embodiment 2 are separately mounted in an own vehicle and in a road-side apparatus.

FIG. 9 is a schematic block diagram representing peripheral devices and the vehicle-traveling control system 200 where the acquisition unit 101 is separated into a first acquisition unit 201a and a second acquisition unit 201b that are separately mounted in the own vehicle VS and in a road-side apparatus RSU, respectively. The vehicle-traveling control system 200 according to Embodiment 2 is different from Embodiment 1 in that vehicle-traveling control system 200 includes a vehicle-side traveling control unit 100A mounted in the own vehicle VS and a road-side traveling control unit 100B mounted in the road-side apparatus RSU and in that the road-side apparatus RSU acquires information pieces on neighboring vehicles and the road information and then transmits the acquired information pieces to the own vehicle VS; the other configurations are the same as those in Embodiment 1.

As represented in FIG. 9, the own vehicle VS is provided with the position receiver 11, the speed sensor 12, and the driving control apparatus 15 and functions in the same manner as in Embodiment 1. The own vehicle VS is provided with the vehicle-side traveling control unit 100A.

Figure 10:
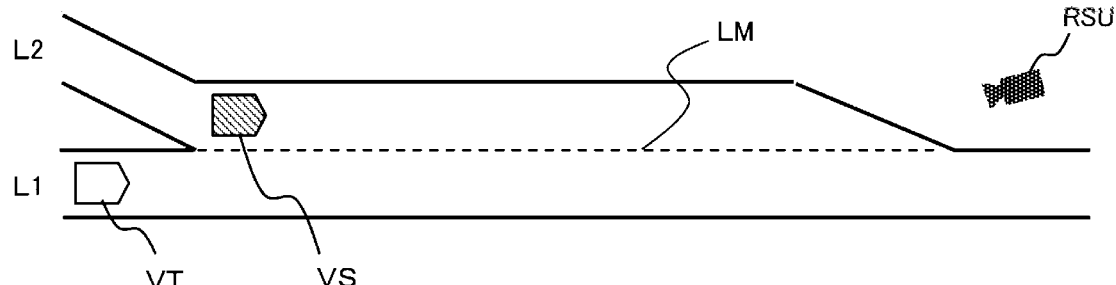
FIG. 10 is a schematic drawing representing a joining portion of a road where the vehicle-traveling control system according to Embodiment 2 is utilized.

In addition, the road-side apparatus RSU is provided in the joining portion where, as represented in FIG. 10, the branch lane L2 joins the main lane L1; the road-side apparatus RSU is provided with a road-side sensor 21 that detects an object on the road, the map storage unit 14 that stores road information pieces including the information pieces on the lanes L1 and L2, and the road-side traveling control unit 100B.

A communication unit 16a and a communication unit 16b are provided in the own vehicle VS and the road-side apparatus RSU, respectively; the own vehicle VS and the road-side apparatus RSU communicate with each other.

The vehicle-side traveling control unit 100A mounted in the own vehicle VS is provided with the first acquisition unit 201a that acquires the positional information on the own vehicle VS from the position receiver 11. The communication unit 16a receives road information pieces including the positional information and the speed information on the subject vehicle VT, information on the main lane L1, and information on the branch lane L2 from the road-side apparatus RSU. Based on the information pieces acquired from the first acquisition unit 201a and the communication unit 16a, the imaginary-vehicle generation unit 203 generates the imaginary vehicle VI that travels at the imaginary speed $V_I$ and whose position coincides with that of the subject vehicle VT on the main lane L1 at the time point $T_S$. Based on the information on the own vehicle VS and the information on the imaginary vehicle VI, the vehicle control unit 204 calculates the acceleration command $a_{ref}$ for controlling the relative distance. The respective specific functions of the first acquisition unit 201a, the imaginary-vehicle generation unit 203, and the vehicle control unit 204 are the same as those in the vehicle-traveling control system 100 according to Embodiment 1; thus, the detailed explanations therefor will be omitted.

The road-side traveling control unit 100B mounted in the road-side apparatus RSU is provided with the second acquisition unit 201b that acquires the positional information pieces and the speed information pieces on neighboring vehicles in the joining portion from the road-side sensor 21 and the road information pieces including the information pieces on the lanes L1 and L2 from the map storage unit 14; the road-side traveling control unit 100B is further provided with the subject vehicle determination unit 202 that determines the subject vehicle VT among the neighboring vehicles, based on the information pieces from the second acquisition unit 201b, and then transmits the positional information and the speed information on the subject vehicle VT to the communication unit 16a.

Then, the communication unit 16b transmits the positional information and the speed information on the subject vehicle VT to the communication unit 16a mounted in the own vehicle VS.

The vehicle-side traveling control unit 100A processes the information pieces received by the communication unit 16a in such a manner as described above, and the driving control apparatus 15 controls the driving apparatus and the braking apparatus of the own vehicle VS, based on the command acquired from the vehicle control unit 204 in the same manner as that in Embodiment 1, so that acceleration/deceleration of the own vehicle VS is controlled.

Figure 11:
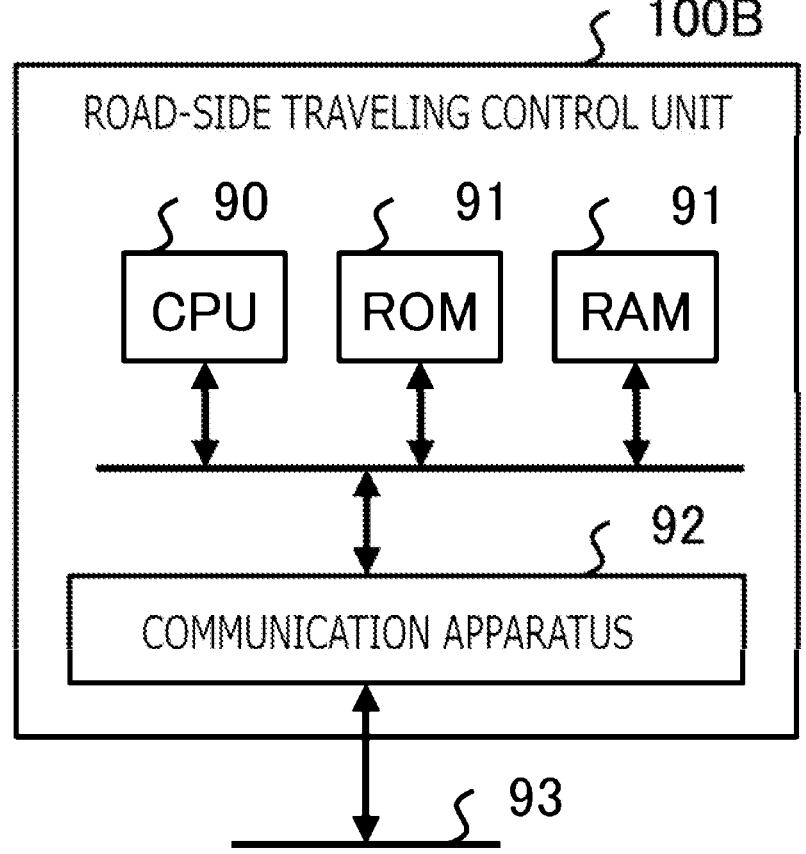
FIG. 11 is a schematic configuration diagram representing an example of a processing circuit that realizes respective functions of a road-side traveling control unit according to Embodiment 2.

FIG. 11 is a configuration diagram representing an example of a processing circuit that realizes the functions of the road-side traveling control unit 100B in FIG. 9. The road-side traveling control unit 100B has a computing processing unit 90, two or more storage apparatuses 91, a communication apparatus 92, and an internal network 93.

As the computing processing unit 90, for example, a CPU is utilized. Each of the two or more storage apparatuses 91 performs transmission/reception of data with the computing processing unit 90 and stores the data. The communication apparatus 92 performs data communication with the internal network 93. The communication apparatus 92 performs communication with the road-side sensor 21 and the map storage unit 14, as the external apparatuses, through the internal network 93.

In addition, it may be allowed that the computing processing unit 90 is provided with, for example, an ASIC, an IC, a DSP, an FPGA, various kinds of logic circuits, and various kinds of signal processing circuits. In addition, it may be allowed that as the computing processing unit 90, two or more computing processing units of the same type or different types are provided and respective processing items are implemented by the two or more computing processing units in a sharing manner. As the two or more storage apparatuses 91, for example, there are provided a RAM that can read data from and write data in the computing processing unit 90 and a ROM that can read data from the computing processing unit 90.

The computing processing unit 90 executes software items or programs stored in the two or more storage apparatuses 91 and collaborates with other hardware devices such as the two or more storage apparatuses 91 and the communication apparatus 92 in the road-side apparatus RSU, so that the respective functions of the road-side traveling control unit 100B are realized. Setting data items to be utilized for the respective functions of the road-side traveling control unit 100B are stored, as part of software items or programs, in the two or more storage apparatuses 91.

As described above, the vehicle-traveling control system 200 according to the present embodiment is provided with the second acquisition unit 201b and the subject vehicle determination unit 202 in the road-side traveling control unit 100B inside the road-side apparatus RSU and with the first acquisition unit 201a, the imaginary-vehicle generation unit 203, and the vehicle control unit 204 in the vehicle-side traveling control unit 100A inside the own vehicle VS, determines the subject vehicle VT when the own vehicle VS traveling on the branch lane L2 joins the main lane L1, sets the collision assumption position Ps at which the subject vehicle VT may collide with the own vehicle VS, generates, at a time before the own vehicle VS reaches the collision assumption position Ps, the imaginary vehicle VI that reaches the collision assumption position Ps when the subject vehicle VT reaches the collision assumption position Ps, and issues a command for controlling the distance between the own vehicle VS and the imaginary vehicle VI; as a result, traveling of the own vehicle VS can be controlled, while the traveling state of the subject vehicle VT is considered so as to appropriately prevent the collision.

Moreover, even when the subject vehicle VT travels at a speed exceeding the speed limit, the collision with the subject vehicle VT can be prevented and traveling with appropriate acceleration/deceleration control can be performed. Moreover, acceleration/deceleration of the own vehicle VS with respect to the imaginary vehicle VI is controlled, so that appropriate travel can be performed without generating acceleration/deceleration more than necessary.

Furthermore, after the target distance d* between the own vehicle VS and the imaginary vehicle VI has been secured and then movement such as joining has been performed, the acceleration command for the set speed is outputted, so that the travel can appropriately be continued at a desired speed. Even when the speed of the subject vehicle VT exceeds the speed limit $V_{LIM}$ of the road, the own vehicle VS can observe the $V_{LIM}$ and can travel at a desired speed when it desires to travel at the desired speed.

Furthermore, even when the subject vehicle VT exists in the dead-angle zone of the peripheral sensor 13 of the own vehicle VS, the positional information and the speed information on the subject vehicle VT traveling on the main lane L1 can be acquired.

In addition, in the present embodiment, there has been explained an example in which the road information is acquired from the map storage unit 14 mounted in the road-side apparatus RSU; however, it may be allowed that the road information is acquired through the road-side sensor 21 mounted in the road-side apparatus RSU. There has been explained an example in which no map storage unit 14 is provided in the own vehicle VS; however, it may be allowed that the map storage unit 14 is provided in the own vehicle VS so as to acquire the road information. The joining control section may be set without utilizing the road information.

In addition, there has been explained an example in which the first acquisition unit 201a and the second acquisition unit 201b are provided in the vehicle-side traveling control unit 100A and the road-side traveling control unit 100B, respectively; however, it may be allowed that the first acquisition unit 201a and the second acquisition unit 201b are provided in the imaginary-vehicle generation unit 203 and the subject vehicle determination unit 202, respectively.

Moreover, it may be allowed that the communication unit 16a and the communication unit 16b are provided in the vehicle-side traveling control unit 100A and the road-side traveling control unit 100B, respectively.

Moreover, it may be allowed that the second acquisition unit 201b is provided in the road-side traveling control unit 100B and the subject vehicle determination unit 202 is provided in the vehicle-side traveling control unit 100A and that the vehicle-side traveling control unit 100A mounted in the own vehicle VS receives information acquired by the second acquisition unit 201b through the communication units 16a and 16b and then processes the information. This method also makes it possible that an effect the same as the foregoing one is obtained.

Embodiment 3

Embodiment 3 will be explained by use of the drawings. The vehicle-traveling control system 200 is configured in a manner the same as that in Embodiment 2. In Embodiment 3, the own vehicle VS is a vehicle that enters an intersection, and the subject vehicle VT is a vehicle that enters the intersection from a lane different from the lane on which the own vehicle VS is traveling. Because the own vehicle VS does not change lanes, it is ascertained whether or not at the intersection, there exists a vehicle that may collide with the own vehicle VS. Thus, the travel destination is the same lane on the intersection; however, the control processing is the same as that in each of Embodiments 1 and 2.

Figure 12:
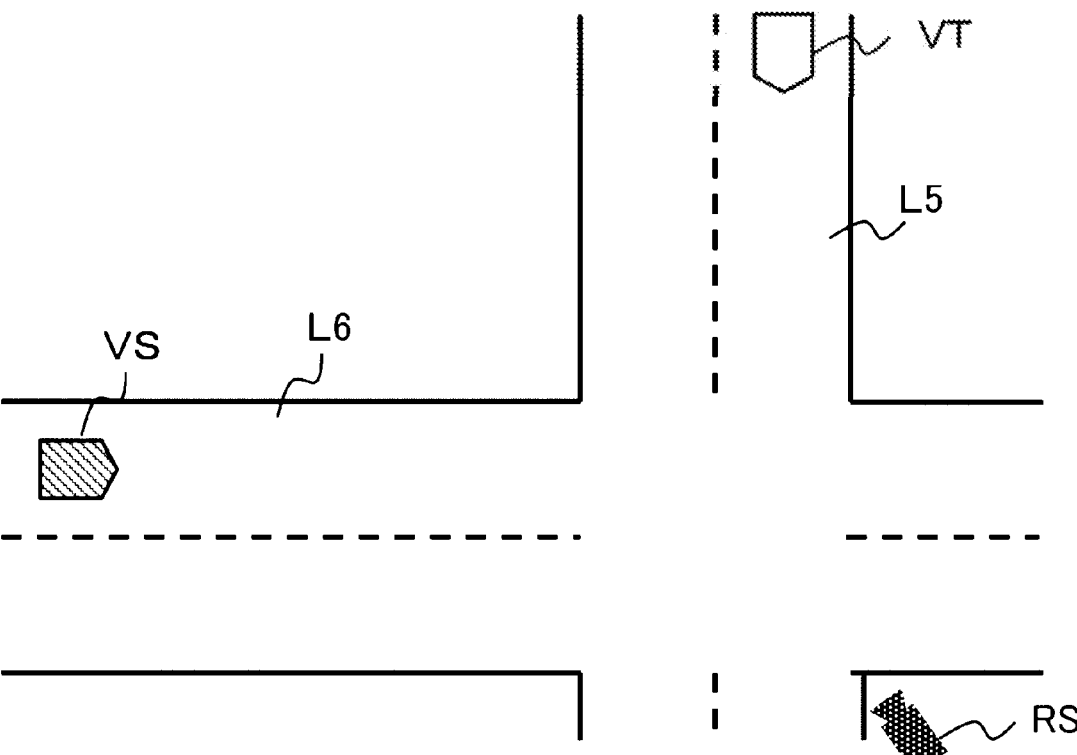
FIG. 12 is a schematic drawing representing a state of a road intersection where a vehicle-traveling control system according to Embodiment 3 is utilized.

FIG. 12 is a schematic drawing representing the state of an intersection of a road where the vehicle-traveling control system 200 is utilized. A lane L5 and a lane L6 on which the own vehicle VS is traveling intersect each other; there is represented the state where both the own vehicle VS and the subject vehicle VT traveling on the lane L5 are trying to enter the intersection. The road-side apparatus RSU is provided at the intersection. Although there is represented an intersection where the lanes L5 and L6 intersect each other at a right angle, it is not necessarily required that the lanes L5 and L6 intersect each other at a right angle.

In this situation, in the case where the own vehicle VS and the subject vehicle VT enter the intersection at one and the same time, the own vehicle VS and the subject vehicle VT may collide with each other. Although there is represented an example in which the subject vehicle VT moves from the top to the bottom on the plane of the paper and the own vehicle VS moves from the left to the right on the plane of the paper, the movement direction does not matter.

The road-side apparatus RSU has the road-side sensor 21, the map storage unit 14, the communication unit 16b and the road-side traveling control unit 100B. The road-side sensor 21 detects vehicles on the intersection. The map storage unit 14 stores road information pieces including the information pieces on the lanes L5 and L6. The communication unit 16b transmits a signal from the road-side traveling control unit 100B to the communication unit 16a of the own vehicle VS.

The road-side traveling control unit 100B has the second acquisition unit 201b and the subject vehicle determination unit 202. The second acquisition unit 201b acquires the positional information pieces and the speed information pieces on neighboring vehicles from the road-side sensor 21 and the road information from the map storage unit 14. Then, the subject vehicle determination unit 202 collates the positional information pieces and the speed information pieces on the neighboring vehicles with the road information and then determines the subject vehicle VT, among the neighboring vehicles, that exists on the lane L5. The positional information and the speed information on the subject vehicle VT are outputted to the communication unit 16$b$ and then are transmitted to the communication unit 16$a$ of the own vehicle VS from the communication unit 16$b$.

The vehicle-side traveling control unit 100A includes the first acquisition unit 201$a$, the imaginary-vehicle generation unit 203, and the vehicle control unit 204. The first acquisition unit 201$a$ acquires the positional information on the own vehicle VS from the position receiver 11.

The imaginary-vehicle generation unit 203 acquires the positional information and the speed information on the subject vehicle VT from the communication unit 16$a$ and then generates the imaginary vehicle VI that travels on the lane L6, which is the present lane on which the own vehicle VS travels and becomes a destination lane. Then, the imaginary-vehicle generation unit 203 outputs the positional information and the speed information on the imaginary vehicle VI to the vehicle control unit 104.

Figure 13A:
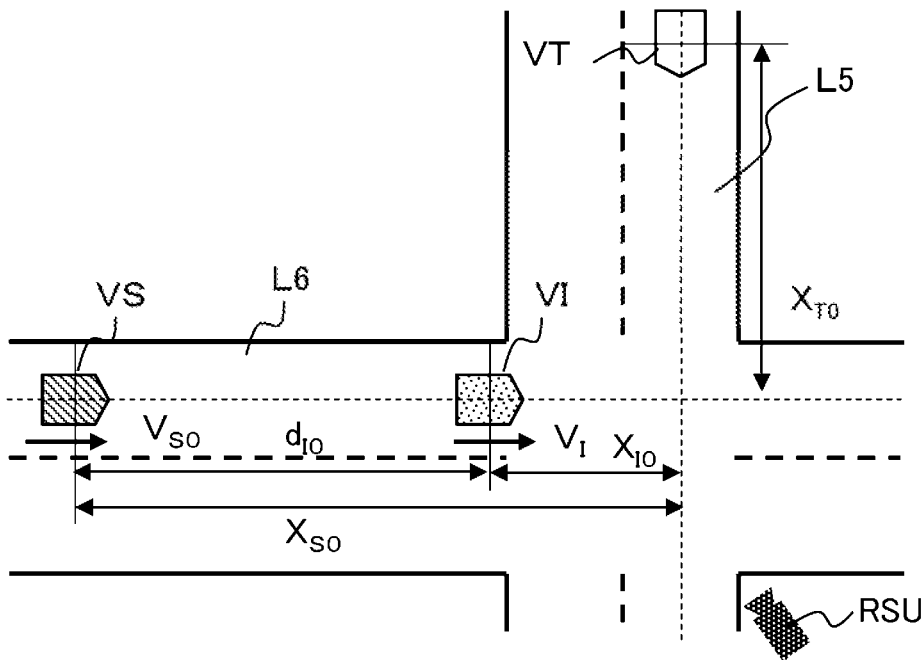
FIG. 13A is a schematic drawing for explaining processing by an imaginary-vehicle generation unit according to Embodiment 3, at a time when control is started.
Figure 13B:
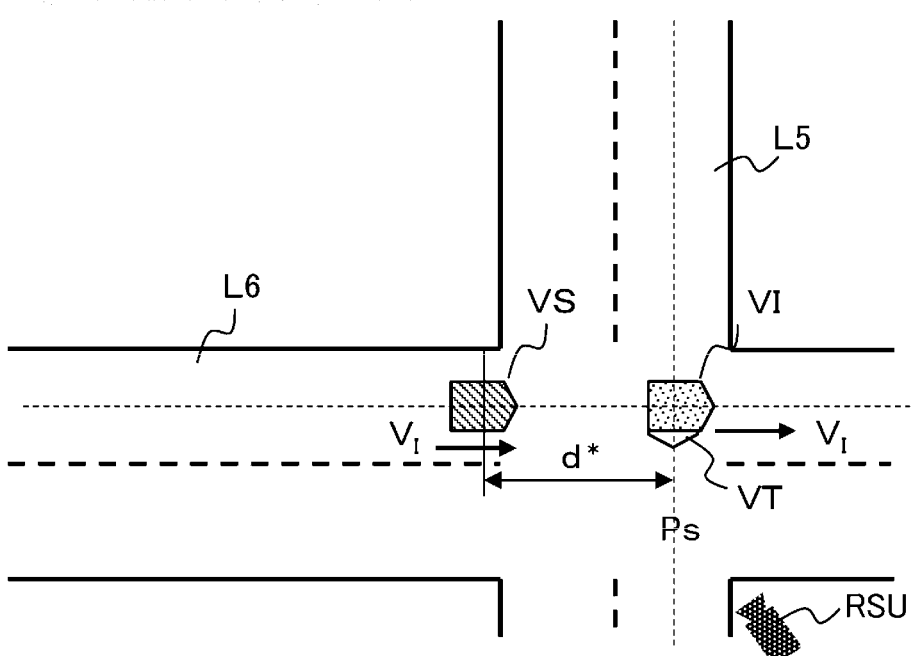
FIG. 13B is a schematic drawing for explaining processing by an imaginary-vehicle generation unit according to Embodiment 3, at a time when the control is performed.

FIG. 13A, 13B are schematic drawings for explaining processing by the imaginary-vehicle generation unit 203, at a time when the control is started and a time when the control is performed. FIG. 13A represents the state where at a time when the control is started, the own vehicle VS is traveling at a position, on the lane L6, that is a distance $x_{S0}$ far from the intersection, and the subject vehicle VT is traveling at a position, on the lane L5, that is a distance $x_{T0}$ far from the intersection, and where both the own vehicle VS and the subject vehicle VT are trying to enter the intersection. The initial speed of the own vehicle VS is $V_{S0}$, and the speed of the subject vehicle VT is $V_T$. FIG. 13B represents the state where the own vehicle VS is controlled at a time when it passes through the intersection.

In this situation, the subject vehicle VT travels the distance $x_{T0}$ at the speed $V_T$ from a time point when the control is started to a time point when it reaches the intersection. Thus, the time T in which the subject vehicle VT travels from a time point when the control is started (a) to a time point when it reaches the intersection (b) is expressed by the equation (6).

$$T = \frac{x_{T0}}{V_T} \tag{6}$$

When the own vehicle VS travels for the time T, while keeping the initial speed $V_{S0}$, the distance from the intersection is expressed by the equation (7). When this distance is shorter than the vehicle length, the own vehicle VS collides with the subject vehicle VT.

$$x_S = x_{S0} - V_{S0}T \tag{7}$$

Accordingly, the imaginary-vehicle generation unit 203 generates the imaginary vehicle VI that travels on the lane L6 at the imaginary speed $V_I$ and then passes through the intersection after the time T has elapsed. As represented in FIG. 13A, the imaginary vehicle VI travels at a position a distance $x_{I0}$ before the intersection. The distance $x_{I0}$ and the relative distance $d_{I0}$ between the own vehicle VS and the imaginary vehicle VI are expressed by the equations (8) and (9), respectively.

$$x_{I0} = V_I T \tag{8}$$

$$d_{I0} = x_{S0} - x_{I0} \tag{9}$$

As is the case with each of Embodiments 1 and 2, the vehicle control unit 204 controls acceleration/deceleration so that the relative distance between the own vehicle VS and the imaginary vehicle VI becomes the target distance d*. As a result, collision with the subject vehicle VT on the intersection is avoided.

In this situation, it is assumed that the speed $V_I$ of the imaginary vehicle VI is the speed limit $V_{LIM}$ of the lane L6, to be acquired from the road information. In the case where the own vehicle VS travels at the speed limit $V_{LIM}$, the imaginary vehicle VI, which has been at the position a distance $x_{I0}$ before the intersection at a time when the control has been started, reaches the position a distance $x_{so}$ advanced from the intersection at a time when the own vehicle VS reaches the intersection, i.e., the same position as that of the subject vehicle VT. Then, the vehicle control unit 204 issues a command to decelerate the own vehicle VS so as to secure the target distance d* between the own vehicle VS and the imaginary vehicle VI; then, after the own vehicle VS passes through the intersection, the vehicle control unit 204 issues a command to accelerate the own vehicle VS up to the imaginary speed $V_I$ (the speed limit $V_{LIM}$) of the imaginary vehicle VI.

That is to say, the own vehicle VS is a vehicle that enters the intersection, and the subject vehicle VT is a vehicle that enters the intersection from a lane different from the lane on which the own vehicle VS is traveling. In this case, assuming that the intersection is the collision assumption position Ps, the imaginary-vehicle generation unit 203 continuously generates the imaginary vehicle VI on the lane on which the own vehicle VS travels, until the own vehicle VS reaches the collision assumption position Ps. Then, the vehicle control unit 104 issues a command to perform control so that the distance between the own vehicle VS and the imaginary vehicle VI becomes the target distance d*.

It may be allowed that the imaginary speed $V_I$ of the imaginary vehicle VI is decided, for example, based on the positional information and the speed information on the subject vehicle VT and the positional information and the speed information on the own vehicle VS. There will be considered the state where from the state in which the control is started (a), the own vehicle VS decelerates at a constant acceleration a (<0), the speed thereof reaches the imaginary speed $V_I$ of the imaginary vehicle VI after the time T has elapsed, and then the own vehicle VS travels, while securing the target distance d* from the imaginary vehicle VI. In this situation, the relationships among the time, the speed, and the distance are expressed by the equations (10) and (11).

$$V_I = V_{S0} + aT \tag{10}$$

$$V_I^2 - V_{S0}^2 = 2a(x_{S0} - d^*) \tag{11}$$

When the equations are rearranged, the speed $V_I$ of the imaginary vehicle VI is expressed by the equation (12) below. Arbitrarily setting of the acceleration a makes it possible to change the imaginary speed $V_I$ of the imaginary vehicle VI, based on the positional information and the speed information on the subject vehicle VT and the positional information and the speed information on the own vehicle VS.

$$V_I = \frac{aT}{2} + \frac{(x_{S0} - d^*)}{T} \qquad (12)$$

In the foregoing explanation, as the respective initial values at a time when the control is started, the distance from the own vehicle VS to the intersection, the distance from the subject vehicle VT to the intersection, and the speed of the own vehicle VS are utilized; when until the own vehicle VS reaches the collision assumption position Ps, the distance $x_S$ from the own vehicle VS to the intersection, the distance $x_T$ from the subject vehicle VT to the intersection, and the speed $V_S$ of the own vehicle VS are utilized, the imaginary vehicle VI can continuously be generated. That is to say, letting $X_T$, $X_I$, $V_T$, and $V_I$ denote the distance from the subject vehicle VT to the collision assumption position Ps, the distance from the imaginary vehicle VI to the collision assumption position Ps, the speed of the subject vehicle VT, and the imaginary speed, respectively, the imaginary vehicle VI is generated until the own vehicle VS reaches the collision assumption position Ps in such a way that the next equation (13) is satisfied, so that it is made possible to generate the imaginary vehicle VI while considering the traveling state of the subject vehicle VT, and hence appropriate collision-prevention control can be performed.

$$\frac{X_T}{V_T} = \frac{X_I}{V_I} \qquad (13)$$

As described above, in the vehicle-traveling control system 200 according to the present embodiment, the imaginary-vehicle generation unit 203 of the vehicle-side traveling control unit 100A determines the subject vehicle VT that travels on the lane L5 at a time when the own vehicle VS traveling on the lane L6 enters an intersection that intersects the lane L5, sets the collision assumption position Ps at which the subject vehicle VT may collide with the own vehicle VS, generates, at a time before the own vehicle VS reaches the collision assumption position Ps, the imaginary vehicle VI that reaches the collision assumption position Ps when the subject vehicle VT reaches the collision assumption position Ps, and issues a command for controlling the distance between the own vehicle VS and the imaginary vehicle VI; as a result, traveling of the own vehicle VS can be controlled, while the traveling state of the subject vehicle VT is considered so as to appropriately prevent the collision.

Moreover, even when the subject vehicle VT travels at a speed exceeding the speed limit, the collision with the subject vehicle VT can be prevented and traveling with appropriate acceleration/deceleration control can be performed. Moreover, acceleration/deceleration of the own vehicle VS with respect to the imaginary vehicle VI is controlled, so that appropriate travel can be performed without generating acceleration/deceleration more than necessary.

Furthermore, after the target distance d* between the own vehicle VS and the imaginary vehicle VI has been secured and then movement such as joining has been performed, the acceleration command for the set speed is outputted, so that the travel can appropriately be continued at a desired speed. Even when the speed of the subject vehicle VT exceeds the speed limit $V_{LIM}$ of the road, the own vehicle VS can observe the $V_{LIM}$ and can travel at a desired speed when it desires to travel at the desired speed.

In addition, in each of foregoing Embodiments 1 through 3, no reference point in the positional information has been referred to; however, it goes without saying that the reference point is determined in order to determine the distance. For example, a position on the center of the vehicle length may be determined as the reference point for the position of the own vehicle VS. A point where the respective positions of the imaginary vehicle VI and the subject vehicle VT coincide with each other has been referred to as the collision assumption position Ps; however, the collision assumption position Ps includes not only the position where the respective reference points, the respective centers, or the like coincide with each other but also the position determined in consideration of collision with the subject vehicle VT. It goes without saying that the position for securing the target distance d* is a distance for preventing the vehicle bodies from hitting each other, i.e., for preventing collision.

Although the present disclosure is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the specification of the present disclosure. For example, at least one of the constituent components may be modified, added, or eliminated; moreover, at least one of the constituent components mentioned in at least one of the preferred embodiments may be selected and combined with the constituent components mentioned in another preferred embodiment.

REFERENCE SIGNS LIST

11: position receiver, 12: speed sensor, 13: peripheral sensor, 14: map storage unit, 15: driving control apparatus, 21: road-side sensor, 16a,16b communication unit, 100,200: vehicle-traveling control system, 100A: vehicle-side traveling control unit, 100B: road-side traveling control unit, 101,201a,201b: acquisition unit, 102,202: subject vehicle determination unit, 103,203: imaginary-vehicle generation unit, 104: vehicle control unit, L1~L6: line, VS: own vehicle, VT: subject vehicle, VI: imaginary vehicle, RSU: road-side apparatus, Ps: collision assumption position

What is claimed is:

1. A vehicle-traveling control system comprising at least one processor configured to implement:

an acquisitor that acquires positional information and speed information on an own vehicle in a branch lane and that acquires positional information pieces and speed information pieces on neighboring vehicles in a main lane;

a subject vehicle determiner that determines a subject vehicle that travels toward a travel destination of the own vehicle and has a possibility of colliding with the own vehicle, based on positional information and speed information on the own vehicle and positional information pieces and speed information pieces on the neighboring vehicles;

an imaginary-vehicle generator configured to, during merging control of the own vehicle from the branch lane to the main lane, generate an imaginary vehicle that travels on the main lane at an imaginary speed, which is set to either a speed of the own vehicle or a speed limit of the branch lane, and set an initial position of the imaginary vehicle in the main lane, prior to the own vehicle reaching a collision assumption position at which the own vehicle and the subject vehicle are predicted to meet as the collision assumption position at a common time point; and a vehicle controller that issues a command for acceleration or deceleration of the own vehicle to adjust a relative position between the own vehicle and the imaginary vehicle such that a target inter-vehicle distance between the own vehicle and the imaginary vehicle is achieved before the own vehicle reaches the collision assumption position, wherein:

based on the speed of the subject vehicle being greater than the imaginary speed, the imaginary vehicle is positioned ahead of the subject vehicle, and the own vehicle is controlled to decelerate and merge behind the imaginary vehicle;

based on the speed of the subject vehicle is less than the imaginary speed, the imaginary vehicle is positioned behind the subject vehicle, and the own vehicle is controlled to accelerate and merge ahead of the imaginary vehicle; and based on the speed of the subject vehicle being equal to the imaginary speed, the imaginary vehicle is positioned at a same location as the subject vehicle, and the own vehicle is controlled to adjust a position of the own vehicle to achieve the target inter-vehicle distance before merging.

2. The vehicle-traveling control system according to claim 1, wherein letting $X_T$, $X_I$, $V_T$, and $V_I$ denote a distance from the subject vehicle to the collision assumption position, a distance from the imaginary vehicle to the collision assumption position, a speed of the subject vehicle, and the imaginary speed, the imaginary-vehicle generator generates the imaginary vehicle in such a way as to satisfy the equation (1) below:

$$\frac{X_T}{V_T} = \frac{X_I}{V_I}. \tag{1}$$

3. The vehicle-traveling control system according to claim 1, wherein the imaginary-vehicle generator sets the collision assumption position within a lane-changing assumption section in which lanes are changed, and then continuously generates the imaginary vehicle in the main lane until the own vehicle reaches the collision assumption position.

4. The vehicle-traveling control system according to claim 3, the imaginary-vehicle generator assumes that a joining control section to be joined by the own vehicle is the lane-changing assumption section, sets the collision assumption position within the lane-changing assumption section, and then continuously generates the imaginary vehicle on the main lane until the own vehicle reaches the collision assumption position.

5. The vehicle-traveling control system according to claim 1, wherein in the case where the travel destination of the own vehicle is an intersection to be entered by the own vehicle and the subject vehicle is a vehicle that enters the intersection from a lane different from a lane on which the own vehicle is traveling, the imaginary-vehicle generator assumes that the intersection is the collision assumption position, and then continuously generates the imaginary vehicle on the lane on which the own vehicle is traveling until the own vehicle reaches the collision assumption position.

6. The vehicle-traveling control system according to claim 1, comprising a plurality of acquisitors, wherein a first acquisitor is provided in the own vehicle and acquires positional information and speed information on the own vehicle, and wherein a second acquisitor is provided in a road-side apparatus disposed at a road side and acquires positional information pieces and speed information pieces on the neighboring vehicles.

7. The vehicle-traveling control system according to claim 1, wherein after the own vehicle reaches the collision assumption position, the vehicle controller issues an acceleration command that becomes a setting speed.

8. The vehicle-traveling control system according to claim 7, wherein the vehicle controller issues an acceleration command while assuming that the setting speed is the speed limit of the main lane of the own vehicle, acquired from the acquisitor, or a preliminarily set speed.

9. A vehicle-traveling control method comprising:

acquiring positional information and speed information on an own vehicle and positional information pieces in a branch lane and speed information pieces on neighboring vehicles in a main lane;

determining a subject vehicle that travels toward a travel destination of the own vehicle and has a possibility of colliding with the own vehicle, based on positional information and speed information on the own vehicle and positional information pieces and speed information pieces on the neighboring vehicles;

during merging control of the own vehicle from the branch lane to the main lane, generating an imaginary vehicle that travels at an imaginary speed, which is set to either a speed of the own vehicle or a speed limit of the main lane;

setting an initial position of imaginary vehicle in the main lane, prior to the own vehicle reaching collision assumption position at which the own vehicle and the subject vehicle are predicted to meet as the collision assumption position at a common time point; and issuing a command for acceleration or deceleration of the own vehicle to adjust a relative position between the own vehicle and the imaginary vehicle such that a target inter-vehicle distance between the own vehicle and the imaginary vehicle is achieved before the own vehicle reaches the collision assumption position, wherein:

based on the speed of the subject vehicle being greater than the imaginary speed, the imaginary vehicle is positioned ahead of the subject vehicle, and the own vehicle is controlled to decelerate and merge behind the imaginary vehicle;

based on the speed of the subject vehicle is less than the imaginary speed, the imaginary vehicle is positioned behind the subject vehicle, and the own vehicle is controlled to accelerate and merge ahead of the imaginary vehicle; and based on the speed of the subject vehicle being equal to the imaginary speed, the imaginary vehicle is positioned at a same location as the subject vehicle, and the own vehicle is controlled to adjust a position of the own vehicle to achieve the target inter-vehicle distance before merging.

* * * * *